United States Patent [19]

Shirota et al.

[11] Patent Number: 5,612,835
[45] Date of Patent: Mar. 18, 1997

[54] METHOD AND DISK APPARATUS FOR AUTOMATICALLY ADJUSTING A HEAD POSITION

[75] Inventors: Hideyuki Shirota; Tatuya Matuzaki, both of Gunma, Japan

[73] Assignee: NEC Corporation, Tokyo, Japan

[21] Appl. No.: 358,371

[22] Filed: Dec. 19, 1994

[30] Foreign Application Priority Data

Dec. 24, 1993 [JP] Japan .................................. 5-326794

[51] Int. Cl.$^6$ ..................... G11B 15/584; G11B 21/02
[52] U.S. Cl. ........................................ 360/78.14; 360/75
[58] Field of Search ............................. 360/75, 77.02, 360/78.04, 78.07, 78.08

[56] References Cited

U.S. PATENT DOCUMENTS

| | | | |
|---|---|---|---|
| 4,924,333 | 5/1990 | Hamaoka | 360/78.11 |
| 5,357,384 | 10/1994 | Tsuyuguchi et al. | 360/75 |
| 5,371,724 | 12/1994 | Uno | 360/78.04 |
| 5,434,724 | 7/1995 | Shoji et al. | 360/75 |

OTHER PUBLICATIONS 3.5" Floppy Disk Drive (FD1139H) Product Description 806–521431–0, NEC Corporation, Jan. 1993.

*Primary Examiner*—Aristotelis Psitos
*Assistant Examiner*—Regina Y. Neal
*Attorney, Agent, or Firm*—Sughrue, Mion, Zinn, Macpeak & Seas

[57] ABSTRACT

A disk apparatus includes a head, a motor for moving the head to a track position on a disk in response to a motor driving signal, a driving-signal generating section for issuing the motor driving signal to the motor in response to each of an external drive instruction from a host, a first drive instruction and a second drive instruction, each of which includes data indicative of the number of tracks for the head to be moved and data indicative of a direction for the head to be moved to, a detector for detecting that the disk is inserted, a first instruction generating section for issuing the first drive instruction such that the head is positioned on a track 0 position of the disk when the detector detects that the disk is inserted, a first counter for summing the number of tracks of each of the external, first and second drive instructions in consideration of the direction, and a second counter for summing the number of tracks of the external drive instruction in consideration of the direction, a second instruction generating section for issuing the second drive instruction such that a value of the first counter becomes equal to that of the second counter when the head is moved to the track 0 position.

17 Claims, 5 Drawing Sheets

METHOD AND DISK APPARATUS FOR AUTOMATICALLY ADJUSTING A HEAD POSITION

BACKGROUND OF THE INVENTION

1. Field of the Invention

The present invention relates to a method of positioning a head and a disk apparatus for the same, and more particularly, to a method in which the position of a head can be automatically adjusted or corrected and a disk apparatus for the same.

2. Description of the Related Art

In a conventional recording system, for example, a magnetic disk recording system, the position of a head is designated by a host. FIG. 1 is a block diagram showing the conventional magnetic disk recording system. As shown in FIG. 1, the magnetic disk recording system includes a host unit 100 and a disk apparatus 102. The host unit 100 outputs an external step pulse signal 131 shown in FIG. 2B and an external direction signal 132 shown in FIG. 2C to the disk apparatus 102. The external step pulse signal 131 includes one or more pulses each of which corresponds to one track. The external direction signal 132 is in a high level, i.e., "H" level when the direction toward the outermost track is designated and is in a low level, i.e., "L" level when the direction toward the innermost track is designated. The external step pulse signal 131 and the external direction signal 132 are received by a drive circuit 135 of the disk apparatus 102. The drive circuit 135 generates a driving signal based on these signals 131 and 132 and drives a motor 137 such as a stepping motor to move a head (not shown) by one track in a direction designated by the external direction signal 132 in response to each of pulses of the external step pulse signal 131. Thus, the head can be positioned on a desired track position. The external step pulse signal 131 and the external direction signal 132 are also supplied to a track counter 134 of the disk apparatus 102. When the external direction signal 132 is in the L level, the track counter 134 counts up in response to each of the pulses of the external step pulse signal 131 and when the external direction signal 132 is in the H level, it counts down in response to each pulse of the external step pulse signal 131, as shown in FIG. 2D. The track counter 134 is reset by a track 0 signal. The track 0 detector 133 detects that the head is positioned in the vicinity of the track of track number 0, i.e., the outermost track in this example, and generates a track 0 detection signal as shown in FIG. 2E. A circuit 138 receives the external direction signal 132, the track 0 detection signal from the track 0 detector 133, and the driving signal 136 from the drive circuit 135 to generate the track 0 signal 139 as shown in FIG. 2F. The track 0 signal 139 is set to the active L level in response to the drive signal 136 when the track 0 detection signal 142 and the direction signal 132 are both in the L level, and it is reset in response to the drive signal toward the innermost track when the track 0 signal is set. The track 0 signal is supplied to the host unit 100 in addition to the track counter 134. An insertion detector 130 generates an insertion detection signal 141 when a disk is inserted or loaded into the disk apparatus 102. The insertion detection signal is not used for control of the movement of the head in the conventional disk apparatus 102 but only for other processing.

Next, the operation of the conventional magnetic disk recording apparatus will be described below with reference to FIGS. 2A to 2G. It is assumed that the head is now positioned on the track position of track number 3 of the disk. Since the external direction signal 132 is in the H level, the track counter 134 receives the pulses of the external step pulse signal 131 from the host unit 100 to count down so that the count is 2, as shown in FIG. 2D. Also, the drive circuit 135 receives the external step pulse signal 131 and the external direction signal 132 to drive the motor 137 such that the head is positioned on the track position of track number 2, as shown in FIG. 2G. Subsequently, the same operation is repeated each time each of the pulses of the external step pulse signal 131 is supplied. When the head is moved close to the outermost track; i.e., the track position of track number 0, the track 0 detector 133 detects that the head is positioned in the vicinity of the outermost track and generates the track 0 detection signal 142 of the L level as shown in FIG. 2E. At this time, if the direction signal 132 is in the H level, the track 0 signal 139 is set to the L level in response to a pulse of the driving signal 136 from the drive circuit 135 and held in the L level until the next pulse of the drive signal 136 is supplied to the circuit 138. The track 0 signal 139 is supplied to the host unit 100. At this time, the head is positioned on the track position of track number 0.

When the external direction signal 132 of the L level is supplied to the disk apparatus 102 from the host unit 100 in response to the track 0 signal 139, the track counter 134 counts up to 3 in response to each of the pulses of the external step pulse signal 131. At the same time, the head is sequentially moved toward the innermost track one track by one track to position on the track position of track number 3.

It is assumed that in such a state the disk is ejected so that the insertion detection signal 141 changes from the H level to the L level. In this case, the head is often moved because of mechanical impact. If the head is mechanically moved to the track position of track number 1, when one pulse of the external step pulse signal 131 is supplied, the count of the track counter is counted up to 4, as shown in FIG. 2D. However, the head is actually positioned on the track position of track number 2, as shown in FIG. 2G.

As described above, in the conventional disk apparatus, there is a problem, in that the read/write operation is made impossible when the head position is moved because of mechanical impact.

SUMMARY OF THE INVENTION

The present invention has, as an object, to provide a disk apparatus by which the position of a head can be automatically corrected when a disk is ejected or inserted.

Another object of the present invention is to provide a disk recording system by which the position of a head can be automatically corrected in response to an instruction.

Further another object of the present invention is to provide a disk apparatus by which a head can be automatically moved to the track 0 position in response to an instruction.

Still another object of the present invention is to provide a method of automatically positioning a head to a desired track position.

In order to achieve the object, a disk apparatus includes a head, a motor for moving the head to a track position on a disk in response to a motor driving signal, a driving signal generating section for issuing the motor driving signal to the motor in response to each of an external drive instruction from a host, a first drive instruction and a second drive instruction, each of which includes data indicative of the number of tracks for the head to be moved and data indicative of a direction for the head to be moved to, a detector for detecting that the disk is inserted, a first instruction generating section for issuing the first drive instruction such that the head is positioned on a track 0 position of the disk when the detector detects that the disk is inserted, a first counter for summing the number of tracks of each of the external, first and second drive instructions in consideration of the direction, and a second counter for summing the number of tracks of the external drive instruction in consideration of the direction, a second instruction generating section for issuing the second drive instruction such that a value of the first counter becomes equal to that of the second counter when the head is moved to the track 0 position.

DESCRIPTION OF THE PREFERRED EMBODIMENTS

The present invention will be described below in detail with reference to the accompanying drawings, taking a magnetic disk recording system as an example.

Figure 1:
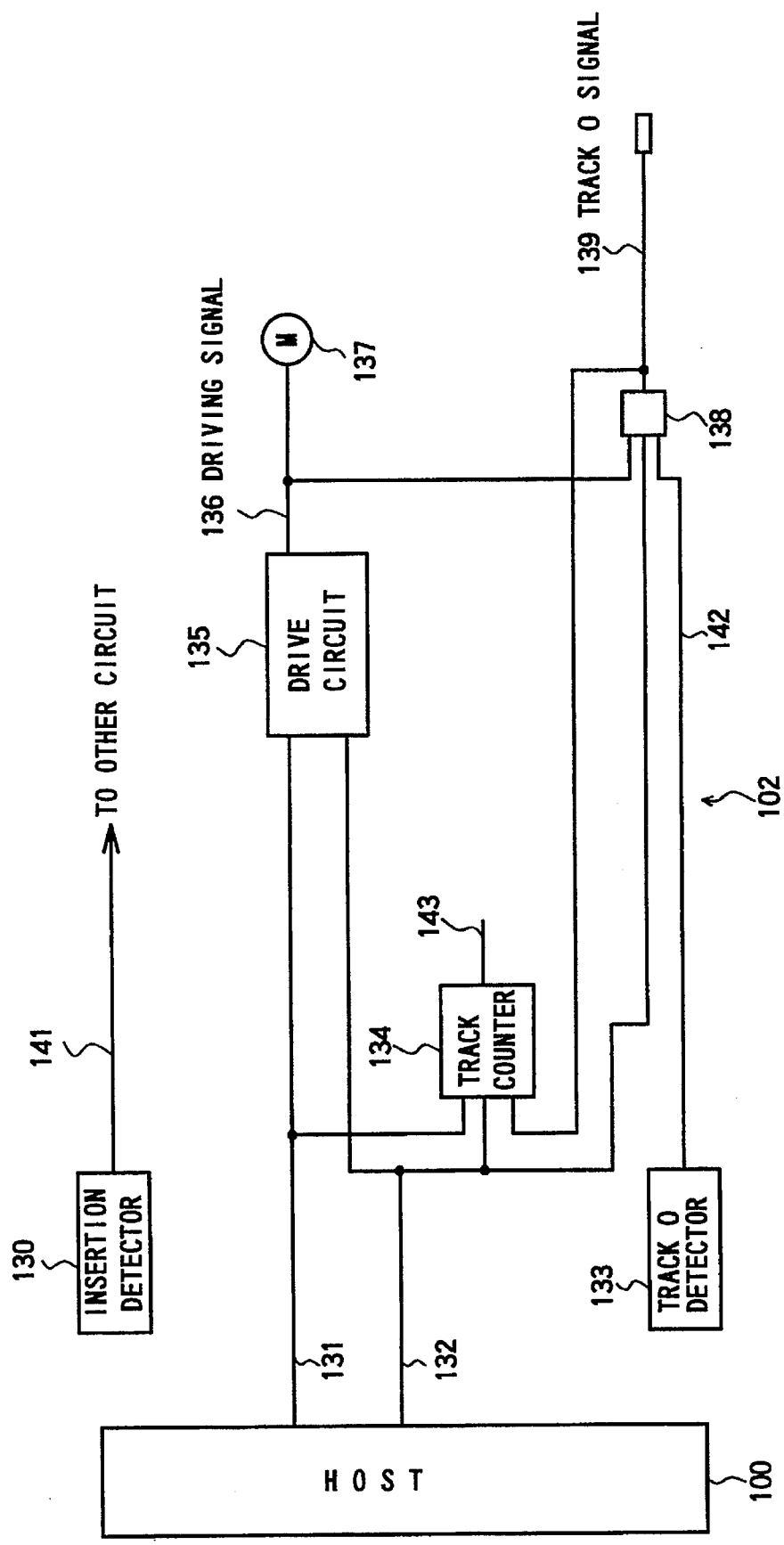
FIG. 1 is a block diagram showing a conventional magnetic disk recording apparatus.
Figure 2:
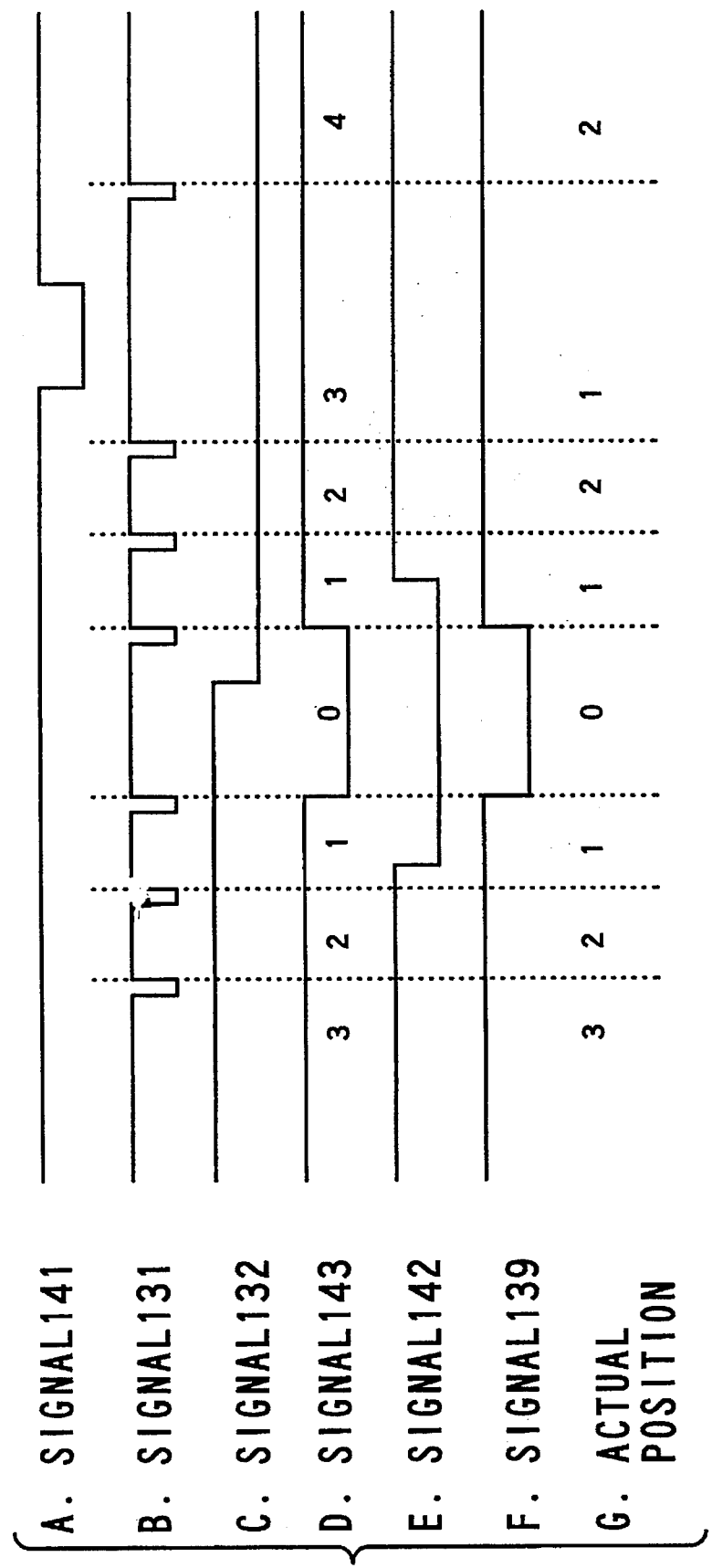
FIGS. 2A to 2G are time charts showing the waveforms of the output 141 of an insertion detector 130, an external step pulse signal 131, an external direction signal 132, the output 143 of a track counter 134, a track 0 detection signal 142, a track 0 signal 139 and an actual head position in the conventional magnetic disk recording apparatus, respectively.
Figure 3:
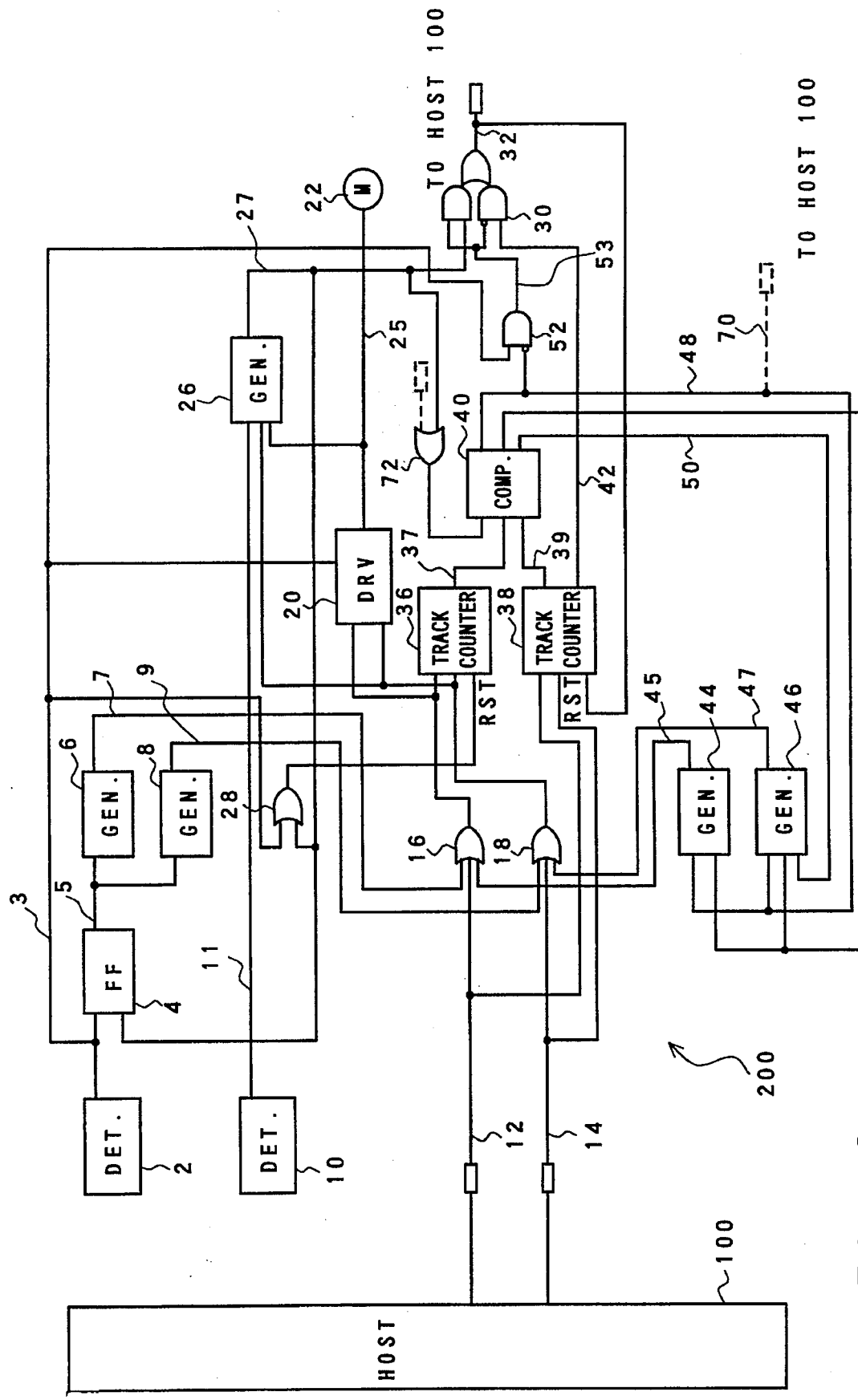
FIG. 3 is a block diagram showing a disk recording apparatus according to an embodiment of the present invention.

FIG. 3 is a block diagram showing the magnetic disk recording system according to an embodiment of the present invention. The magnetic disk recording system includes a host unit 100 and a disk apparatus 200 connected to the host unit 100. The host unit 100 outputs an external step pulse signal 12 and an external direction signal 14 to the disk apparatus 200 and receives an external track 0 signal 32 from the disk apparatus 200. The external direction signal 14 has an H level when the head is to be moved toward the outermost track, i.e., the track of track number 0, and an L level when the head is to be moved toward the innermost track.

The external step pulse signal 12 and external direction signal 14 from the host unit 100 are received at OR gate circuits 16 and 18, respectively. The disk apparatus 200 includes two track counters 36 and 38. The track counter 36 receives the outputs of the OR gate circuits 16 and 18 at its clock terminal and control terminal, respectively. The track counter 38 directly receives the external step pulse signal 12 and the external direction signal 14 at its clock terminal and control terminal from the host unit 100, respectively. The track counter 38 generates a signal 39 indicative of the count of "0" when the count is "0". The outputs of the OR gate circuits 16 and 18 are also supplied to the driving circuit 20 as well as an insertion detection signal 3 and the driving circuit 20 generates a driving signal 25 based on the outputs of the OR gate circuits 16 and 18 in accordance with the insertion detection signal 3. The output of the driving circuit 20 is supplied to a stepping motor 22 and a signal generating circuit 26 as the driving signal 25. The stepping motor 22 drives a magnetic head (not shown) to a track position designated by the host unit 100 in response to the driving signal 25.

The insertion detector 2 detects whether or not a magnetic disk (not shown) is inserted or loaded in the disk apparatus and generates the insertion detection signal 3 of an H level when the magnetic disk is inserted. The insertion detection signal 3 is supplied to a recalibrating flip-flop (FF) 4, an OR gate circuit 28, the driving circuit 20 and an AND gate 52. The recalibrating FF 4 is set in response to the insertion detection signal 3 and reset in response to an internal track 0 signal 27 inputted thereto. Signal generating circuits 6 and 8 connected to the recalibrating FF 4 generate a first internal step pulse signal 7 and a first internal direction signal 9 when the recalibrating FF 4 is set and these signals 7 and 9 are supplied to the OR gate circuits 16 and 18 as the internal step pulse and direction signals, respectively.

A track 0 detector 10 detects that the magnetic head is positioned in the vicinity of the track position of track number 0 and generates a track 0 detection signal 11 of the L level which is supplied to a signal generating circuit 26. The circuit 26 generates an internal track 0 signal 27 of the active L level from the track 0 detection signal 11, the output of the OR gate circuit 18 as a direction signal, and the output of the driving circuit 20 as the driving signal. The internal track 0 signal 27 is supplied to the recalibrating FF 4 to reset it, the OR gate circuit 28, a comparator 40 and the selector 30. The OR gate circuit 28 receives the insertion detection signal 3 from the insertion detector 2 and the internal track 0 signal 27 and outputs the result of logical OR calculation to the track counter 36 at the reset terminal. The track counter 36 is reset in response to the output of the OR gate circuit 28.

The comparator 40 receives the internal track 0 signal 27 at the control terminal and compares the output of the track counter 38 and the output of the track counter 36. The comparator 40 generates an equal signal 48 of the H level when both the outputs are not equal to each other and supplies to signal generating circuits 44 and 46. Also, the comparator 40 generates a difference signal 50 of the L level when the count of the track counter 36 is equal to or smaller than that of the track counter 38 and supplies the difference signal 50 to the signal generating circuit 46. Further the comparator 40 generates a start signal and supplies to the circuits 44 and 46. The circuit 44 generates a second internal step pulse signal 45 in response to the equal signal 48 of the H level and the start signal and supplies it to the OR gate circuit 16 as the internal step pulse signal. The circuit 46 generates a second internal direction signal 47 in response to the equal signal 48 of the H level and the start signal and difference signal 50, and supplies it to the OR gate circuit 18 as the internal direction signal.

The insertion detection signal 3 from the insertion detector 2 is supplied to one input of an AND gate circuit 52. The equal signal 48 from the comparator 40 is another inverted input of the AND gate circuit 52. The output 53 of the AND gate circuit 52 is supplied to the selector 30. Also, the count 0 signal 38 from the track counter 42 and the internal track 0 signal 27 from the signal generating circuit 26 are supplied to the selector 30. The selector 30 selects one of the count 0 signal 42 and internal track 0 signal 27 in accordance with the output 53 of the AND gate circuit 52 and supplies the selected signal to the host unit 100 as the external track 0 signal 32.

Next, the operation of the magnetic disk recording system according to the embodiment of the present invention will be described below with reference to FIGS. 4A to 4Q. It is assumed that the magnetic head which is driven by the stepping motor 22 is positioned on a track number "3" and the counts of the track counters 36 and 38 are both "3".

Figure 4:
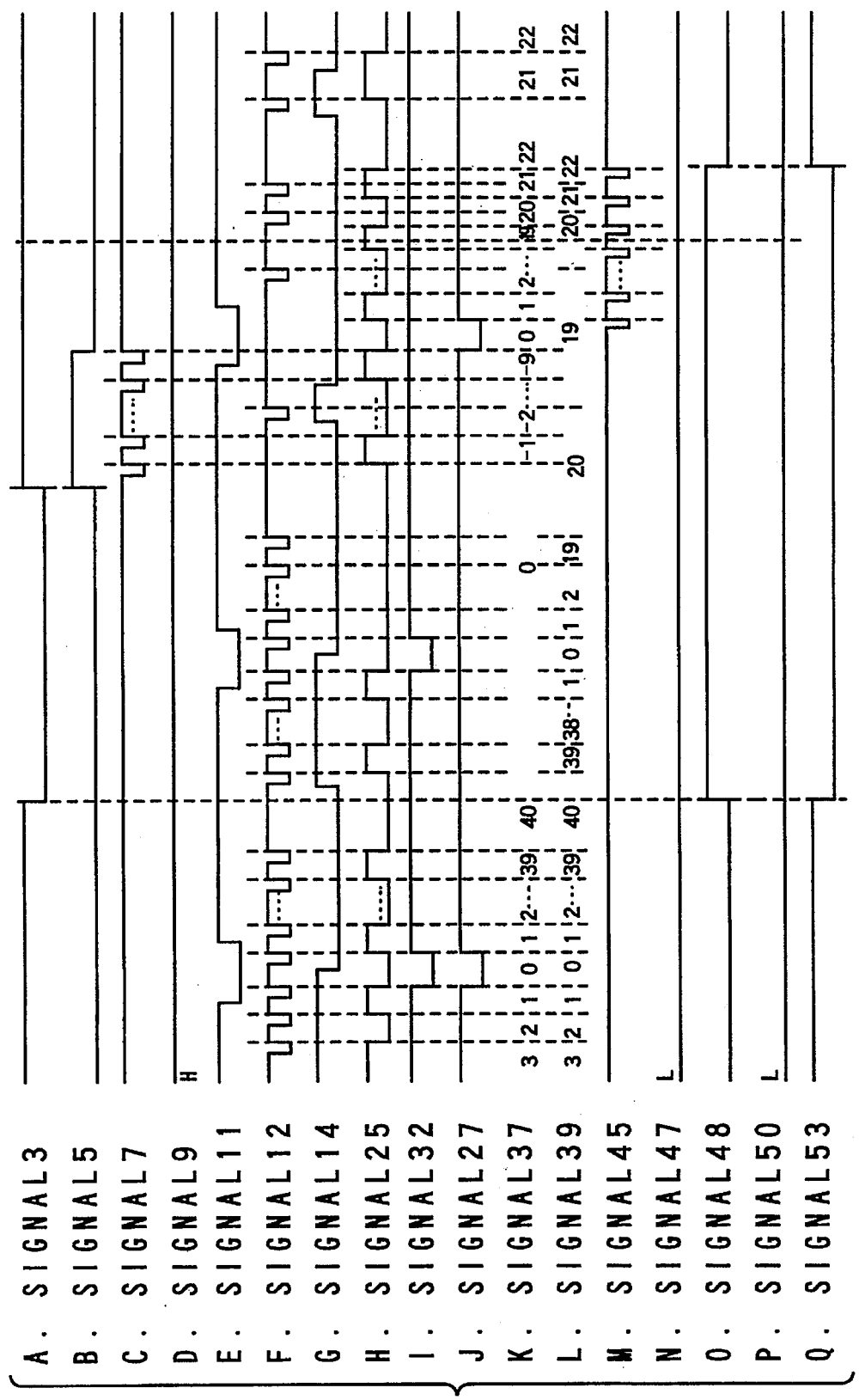
FIGS. 4A to 4Q are time charts showing the waveforms of the output 3 of an insertion detector 2, the output 5 of a recalibration flip-flop 4, a first internal step pulse signal 7, a first internal direction signal 9, a track 0 detection signal 11, an external step pulse signal 12, an external direction signal 14, a driving signal 25, an external track 0 signal 32 and an internal track 0 signal 27, the count 37 of a first track counter, the count 39 of a second track counter, the waveforms of a second internal step pulse signal 45, a second internal direction signal 47, an equal signal 48, a difference signal 50, and the output 53 of an AND gate circuit 52.

First, when the external direction signal 14 of "H" level and the external step pulse signal 12 of one pulse are supplied from the host unit 100 to the disk apparatus 200, as shown in FIGS. 4F and 4G, the track counters 36 and 38 are both counted down by one to 2, as shown in FIGS. 4K and 4L because the external direction signal 14 is in "H" level, i.e., the external direction signal 14 designates the movement of the magnetic head toward the outermost track, as shown in FIG. 4A. Also, the driving circuit 20 generates the driving signal for one pulse. At this time, because the magnetic disk is loaded in the disk apparatus 200, the insertion detector 2 holds the insertion detection signal 3 in the H level. Therefore, the driving circuit 20 outputs the driving signal to the stepping motor 22 such that the magnetic head is positioned on the track position of track number "2", as shown in FIG. 4H. Because the insertion detection signal 3 is kept in the H level and the internal track 0 signal 27 of the L level is not generated, the track counter 36 is not reset. Thereafter, the same operation is repeated each time each of pulses of the external step pulse signal 12 is inputted from the host unit 100 to the disk apparatus 200 while the external direction signal 14 is in the "H" level. As a result, the magnetic head is moved toward the outermost track.

When the magnetic head is positioned in the vicinity of the outermost track, the track 0 detector 10 detects the magnetic head to generate the track 0 detection signal 11 of "L" level, as shown in FIG. 4E. The track 0 detection signal 11 is supplied to the signal generating circuit 26 as well as the external direction signal 14 of the H level. The circuit 26 generates the internal track 0 signal 27 of the L level in response to the driving signal 25 from the driving circuit 20 which corresponds to a pulse of the external step pulse signal 12 for designating the track position of track number 0, as shown in FIG. 4J. The internal track 0 signal 27 is selected by the selector 30 in accordance with the output 53 of the AND gate circuit 52 and outputted to the host unit 100 as the external track 0 signal 32, as shown in FIG. 4I, because the insertion detection signal is in the H level and the equal signal 48 is in the L level. The host unit 100 changes the external direction signal 14 in level from the H level to the L level in response to the external track 0 signal 32, as shown in FIG. 4G. The internal track 0 signal 27 is also supplied to the track counter 36 via the OR gate circuit 28 such that it is reset, as shown in FIG. 4K. However, because the counts of the counters 36 and 38 are both 0, no change occurs. Further, the internal track 0 signal 27 is supplied to the comparator 40. However, because the counts of the counters 36 and 38 are coincident with each other, the equal signal 48 is held to the L level, as shown in FIG. 4O.

Subsequently, the external step pulse signal 12 of 40 pulses are inputted to the disk apparatus 200 from the host unit 100 as shown in FIG. 4F when the external direction signal 14 is in the "L" level as shown in FIG. 4G. In this case, the track counters 36 and 38 count up to 40 in response to each pulse of the external step pulse signal 12 as shown in FIGS. 4K and 4L.

It is assumed that at this time the disk is ejected or unloaded. The insertion detector 2 detects the ejection of the disk to generate the insertion detection signal 3 of the L level as shown in FIG. 4A. The insertion detection signal 3 is supplied to the track counter 36 via the OR gate circuit 28 so that the track counter 36 is reset to 0, as shown in FIG. 4K. If the external step pulse signal and the external direction signal are supplied from the host unit 100 when a disk is not loaded in the disk apparatus 200, only the track counter 38 counts up or down the number of pulses of the external step pulse signal in accordance with the external direction signal as shown in FIG. 4L because the track counter 36 is held in the reset state as shown in FIG. 4K. Thus, the track counter 38 always follows the track position instructed by the host unit 100. Although the counts of the track counters 36 and 38 are not coincident with each other while the disk is not loaded, as shown in FIGS. 4K and 4L, the comparator 40 is not initiated because the internal track 0 signal 27 is not generated. Also, the insertion detection signal 3 is supplied to the driving circuit 20. The driving circuit 20 does not generate the driving signal 25 for driving the head in the direction of the innermost track while the insertion detection signal 3 of the L level is supplied, even if the external step pulse signal 12 is supplied from the host unit 100 or the internal step pulse signal 7 or 45 is generated by the signal generating circuit 6 or 44. Therefore, the head is not moved in the direction of the innermost track by the stepping motor 22. However, if the external step pulse signal 12 and external direction signal 14 for the direction toward the outermost track or internal step pulse signal 7 or 45 and internal direction signal 9 or 47 for the direction toward the outermost track is supplied, the driving circuit 20 supplies the driving signal 25 to the stepping motor such that the head is moved into the direction toward the outermost track as shown in FIG. 4H. The same function may be achieved by a mechanical stopper (not shown) such that the head is prevented from being moved in the direction of the innermost track while a disk is not loaded but the mechanical stopper does not act on the movement of the head in the direction of the outermost track. When the head is moved into the vicinity of the outermost track, the track 0 detection signal 11 is generated as shown in FIG. 4E, and the external track 0 signal 32 is outputted to the host unit 100 as shown in FIG. 4I because the internal track 0 signal is in the H level.

Thereafter, the external step pulse signal 12 and the external direction signal 14 are supplied from the host unit 100, and the head is moved to the track position of track number 20. At this time, if a disk is loaded as shown in FIG. 4A, the insertion detection signal 3 changes in level from the L level to the H level. In response to this, the recalibrating FF 4 is set as shown in FIG. 4B, so that the signal generating circuit 6 generates the first internal step pulse signal 7 as shown in FIG. 4C and the signal generating circuit 8 generates the first internal direction signal 9 of the H level as shown in FIG. 4D. The first internal step pulse and direction signals 7 and 9 are supplied to the driving circuit 20 via the OR gate circuit 16 and 18, respectively. Since the insertion detecting signal 3 is now in the H level, the driving signal is supplied to the stepping motor 22 via the drive control circuit 24 such that the head is moved toward the outermost track. When the head reaches the outermost track, i.e., the track position of track number 0, the internal track 0 signal 27 is generated as described above and shown in FIG. 4J. However, at this time, the internal track 0 signal 27 is not selected by the selector 30 and therefore the external track 0 signal is not outputted to the host unit 100 as shown in 4I since the insertion detection signal 3 is in the H level and the output signal 42 of the track counter is in the H level. The recalibrating FF 4 is reset to the L level in response to the internal track 0 signal 27, as shown in FIG. 4B, so that the signal generating circuits 6 and 8 are also stopped or reset.

In response to the internal track 0 signal 27, the comparator 40 is initiated to generate the start signal. The equal signal 48 of the H level is already generated as shown in FIG. 4O, because the count of the track counter 36 is not equal to that of the track counter 38. Also, the difference signal 50 of the L level is already generated as shown in FIG. 4P because the count of the track counter 36 is smaller than that of the track counter 38. The signal generating circuit 46 generates the second internal direction signal 47 of the L level in response to the equal signal 48, the difference signal 50 and the start signal as shown in FIG. 4N because the count of the track counter 38 is not greater than that of the track counter 36. The signal generating circuit 44 generates the second internal step pulse signal 45 in response to the equal signal 48 and the start signal as shown in FIG. 4M. The driving circuit 20 generates the driving signal 25 in response to the second internal step pulse and direction signals 45 and 47 and the head is driven by the stepping motor 22 in the direction of the innermost track. Also, the track counter 36 counts up the pulses of the second internal step pulse signal 45 until the count of the track counter 36 is equal to that of the track counter 38. When these counts are equal to each other, the comparator 40 resets the start signal so that the circuits 44 and 46 are stopped or reset as shown in FIGS. 4M and 4N. Thereafter, the normal operation is performed as first described.

In this embodiment, if the external step pulse signal 12 and the external direction signal 14 are supplied from the host unit 100 while the first internal step pulse signal 7 is generated by the circuit 6 as shown in FIG. 4F, the stepping motor 22 is driven in response to the external signals from the host unit 100 as well as the internal signals. However, the equal signal 48 may be outputted to the host unit 100 as a busy signal 70, as shown by a dashed line in FIG. 3. In this case, the host unit 100 is inhibited from outputting the external signals to the disk apparatus 200.

In addition, the track counter 36 may be reset when the insertion detection signal 3 changes from the L level to the H level.

Figure 5:
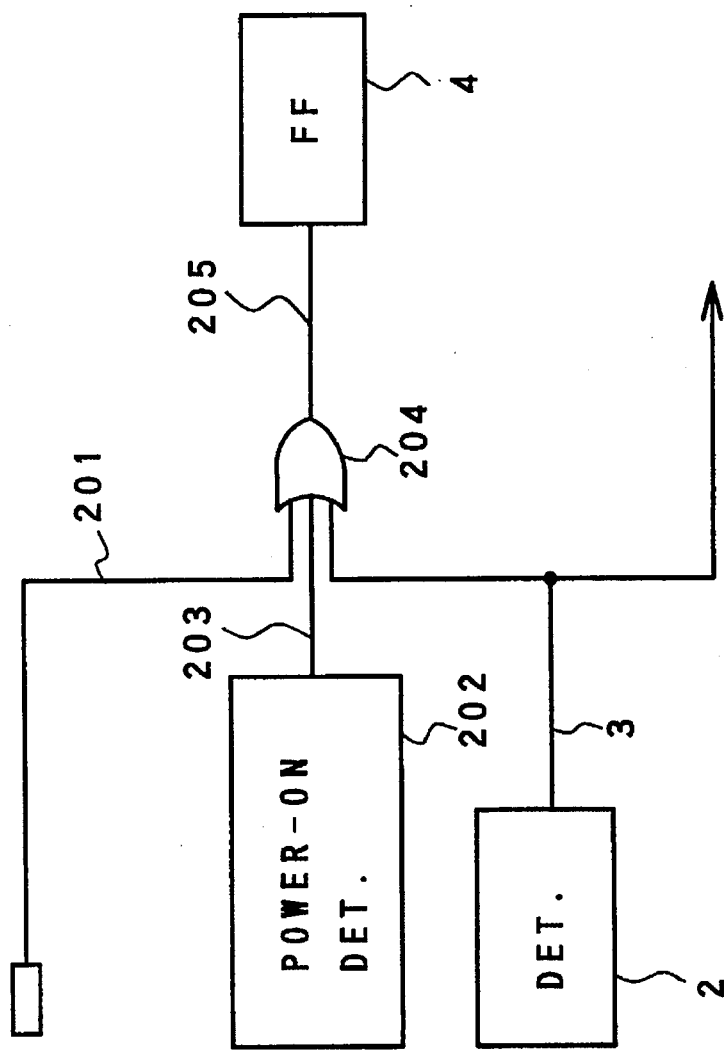
FIG. 5 is a block diagram showing a modification of the disk recording apparatus according to the present invention.

Next, another embodiment of the present invention will be described below. Referring to FIG. 5, The insertion detection signal 3 is not directly supplied to the recalibrating FF 4. The disk apparatus 200 is further provided with a power-on detector 202 and an OR gate circuit 204. The power-on detector 202 detects that the disk apparatus 200 is powered on and generates a power-on detection signal 203 to supply it to the OR gate circuit 204. The OR gate circuit 204 is also supplied with a reset instruction 201 from the host unit 100. The logical OR of the power-on detection signal 203 from the power-on detector 202, the insertion detection signal 3 from the insertion detector 2 and the reset instruction 201 from the host unit 100 is calculated by the OR gate circuit 204 and the output of the OR gate circuit 204 is supplied to the recalibrating FF 4 as a recalibration signal.

According to such a structure, when the disk apparatus 200 is powered on, the above recalibrating operation is necessarily performed. Also, the host unit 100 can output the reset instruction to the disk apparatus 200 at a desired time. The recalibrating operation is performed in the disk apparatus 200 in response to the reset instruction. Since the power-on detection signal and the reset instruction is not supplied to the driving circuit 20, the head is not driven in the direction of the innermost track in response to each of the power-on detection signal and the reset instruction but in the direction of the outermost track. However, the output 205 of the OR gate circuit 204 may be supplied to the driving circuit 20, the OR gate circuit 28, and the AND gate circuit 52 in addition to the recalibrating FF 4.

Further, an OR gate circuit 72 may be provided to perform a logic OR calculation of the internal track 0 signal and an adjustment instruction from the host unit 100 as shown in FIG. 3. In this case, the above-mentioned operation can be performed in response to the internal track 0 signal or the adjustment instruction from the host unit 100.

What is claimed is:

1. A storage disk apparatus, comprising:

a head;

a driving motor for moving said head a track position on a storage disk in response to a motor driving signal;

driving signal generating means for issuing said motor driving signal to said driving motor in response to each of an external drive instruction from a host, a first drive instruction and a second drive instruction, each of which includes data indicative of the number of tracks for said head to be moved and data indicative of a direction for said head to be moved to;

a detector for detecting that said storage disk is inserted;

first instruction generating means for issuing said first drive instruction such that said head is positioned on a track 0 position of said storage disk when said detector detects that said storage disk is inserted;

a first counter for summing the number of tracks of each of said external, first and second drive instructions in consideration of the direction;

a second counter for summing the number of tracks of said external drive instruction in consideration of the direction;

second instruction generating means for issuing said second drive instruction such that a value of said first counter becomes equal to that of said second counter when said head is moved to the track 0 position.

2. A storage disk apparatus according to claim 1, further comprising means for issuing a track 0 signal to said host when said head is moved to the track 0 position.

3. A storage disk apparatus according to claim 1, further comprising means for inhibiting said driving signal generating means from generating said driving signal in response to said external drive instruction after said head is positioned on the track 0 position of said storage disk.

4. A disk apparatus having a head, for positioning said head on a disk, comprising:

a driving motor for moving said head on said disk in response to a motor driving signal;

driving signal generating means for issuing said motor driving signal to said driving motor in response to each of an external drive instruction from a host and an internal drive instruction;

track 0 instructing means for issuing said internal drive instruction to said driving signal generating means in response to a reset instruction such that said head is positioned on a track 0 position of said disk;

designated head position data holding means for holding data indicative of a designated head position and updating the designated head position data in response to said external drive instruction from the host; and correcting means for issuing said internal drive instruction to said driving signal generating means in response to an adjustment instruction when said head is positioned on said track 0 position in response to said reset instruction; said correcting means comprising current head position data holding means for holding data indicative of the current head position and updating the current head position data in response to each of said external drive instruction and said internal drive instruction, comparing means for comparing the current head position data with the designated head position data, and generating means for generating said adjustment instruction when it is determined by said comparing means that the current head position data is not equal to the designated head position data.

5. A disk apparatus according to claim 4, wherein said host generates and issues said reset instruction to said track 0 instructing means.

6. A disk apparatus according to claim 4, further comprising means for issuing said reset instruction when said disk apparatus is powered on.

7. A disk apparatus according to claim 4, further comprising a detector for detecting that said disk is loaded in said disk apparatus, to issue said reset instruction.

8. A disk apparatus according to claim 4, further comprising means for issuing to said host a track 0 signal indicating that said head is positioned to the track 0 position.

9. A disk apparatus according to claim 4, further comprising means for inhibiting said driving signal generating means from generating said driving signal for moving the head in a direction opposite to that toward the track 0 position of said disk.

10. A disk apparatus according to claim 4, further comprising additional means for issuing to said driving signal generating means the internal drive instruction for positioning the head on a track position indicated by the designated head position data in response to said adjustment instruction.

11. A disk apparatus according to claim 10, wherein said host issues said adjustment instruction to said additional means.

12. A disk apparatus according to claim 10, wherein said host generates and issues said reset instruction to said track 0 instructing means.

13. A disk apparatus according to claim 10, further comprising means for issuing said reset instruction when said disk apparatus is powered on.

14. A disk apparatus according to claim 10, further comprising a detector for detecting that said disk is loaded in said disk apparatus, to issue said reset instruction.

15. A disk apparatus according to claim 10, further comprising means for issuing a track 0 signal indicating that said head is positioned to the track 0 position.

16. A disk apparatus according to claim 10, further comprising means for inhibiting said driving signal generating means from generating said driving signal in response to said external drive instruction after said head is positioned on the track 0 position of said storage disk.

17. A method positioning a head on a disk, comprising the steps of:

supplying an external head position instruction from a host unit to a disk apparatus;

updating data indicative of a designated head position in response to said external head position instruction from said host unit;

moving a head position in response to said external head position instruction;

generating an internal head position instruction in response to a reset instruction such that said head position is equal to a track 0 position of said disk;

updating data indicative of the current head position in response to each of said external head position instruction and said internal head position instruction;

comparing said data indicative of a designated head position with said data indicative of the current head position;

generating an adjustment instruction when it is determined that said data indicative of the current head position data is not equal to said data indicative of the designated head position data;

generating said internal head position instruction in the disk apparatus in response to said adjustment instruction; and moving the head position in response to said internal head position instruction such that an actual head position is equal to the head position indicated by said designated head position data.

\* \* \* \* \*